June 21, 1955     B. M. HYMAN     2,711,244
PLATFORM AUGER FOR HARVESTERS
Filed Nov. 1, 1952
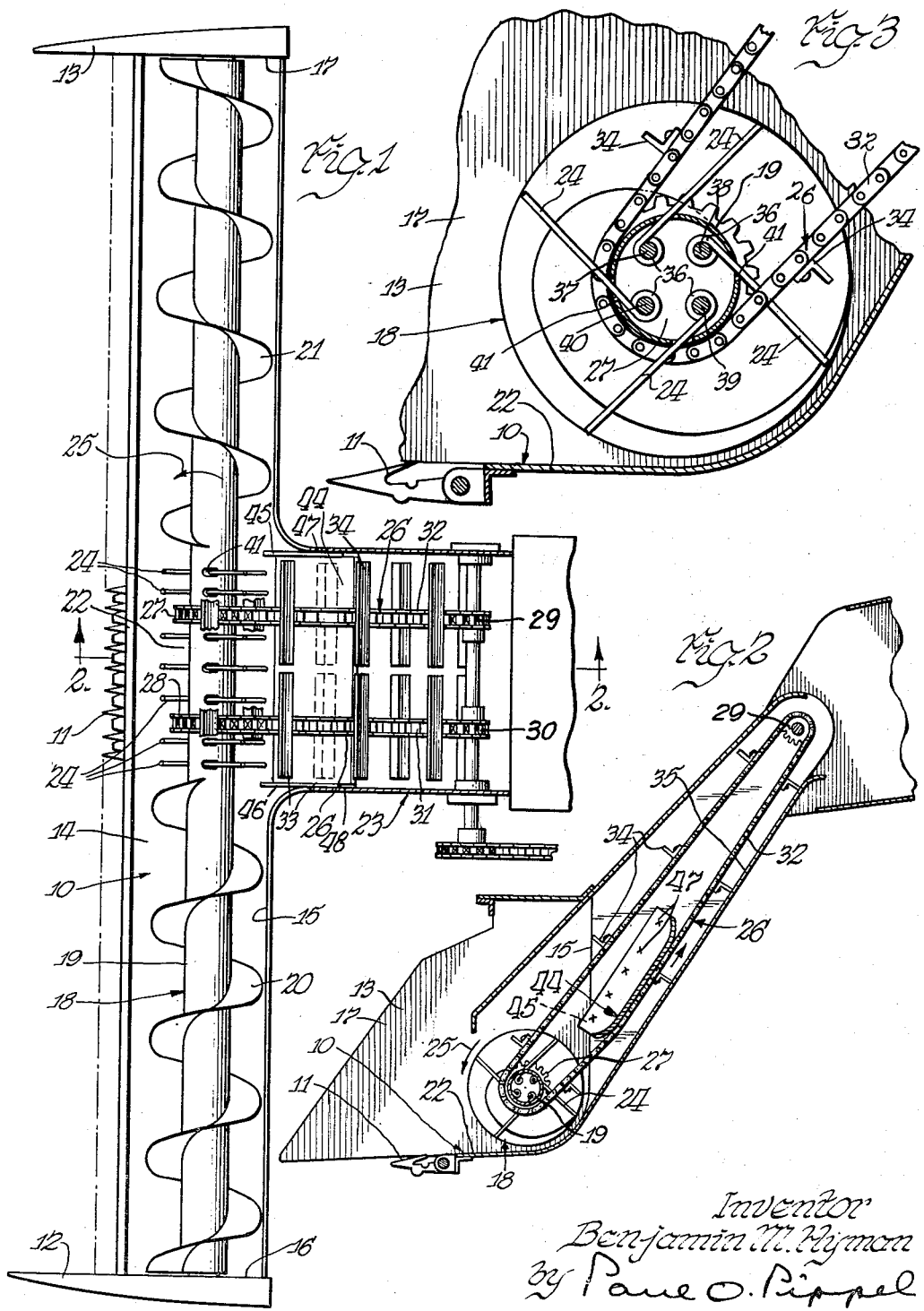
Inventor
Benjamin M. Hyman
By Paul O. Pippel
Atty.

United States Patent Office 2,711,244
Patented June 21, 1955

2,711,244

PLATFORM AUGER FOR HARVESTERS

Benjamin M. Hyman, East Moline, Ill., assignor to International Harvester Company, a corporation of New Jersey Application November 1, 1952, Serial No. 318,234

1 Claim. (Cl. 198—9)

This invention relates to a new and improved platform auger for harvesters.

Harvesters and particularly harvester threshers are concerned with the cutting and/or picking up of grain and thereafter aggregating the harvested grain and delivering it in a narrow path to a treating means such as a thresher and separator. The harvester platforms with which the present invention is concerned are relatively wide and employ conveyor means for delivering the harvested grain to one portion of the platform and thereafter employing a feeder means for removing the gathered grain at right angles thereto. There have been many means devised to effect the transition from the lateral movement of grain across a platform to a longitudinal movement.

It is, therefore, a principal object of this invention to provide a means on a harvester platform for changing the direction of laterally moving grain to a longitudinal movement.

An important object of this invention is to supply a harvester platform with a transversely disposed auger conveyor arranged and constructed to feed grain longitudinally of the auger and across the platform to a position adjacent an upwardly and rearwardly extending feeder conveyor and the auger conveyor adapted to form the lower support for the endless chain type feeder conveyor.

Another and further important object of this invention lies in the provision of means in the form of spring fingers carried by the core of an auger conveyor on harvester platforms and having an endless feeder conveyor draped around the auger conveyor and arranged in offset timed relation with the spring fingers to effect an endwise outward stripping of the spring fingers by the cross slats of the endless feeder conveyor.

Another and further important object of this invention is to provide a central feeding auger conveyor on a harvester platform with outwardly extending spring fingers on the core thereof adjacent the central feeding location and including an upwardly and rearwardly feeding endless chain conveyor employing the auger conveyor at its lower drive means and the conveyor having cross slats to insure a stripping of the grain from the spring fingers and effecting an upward and rearward movement of the grain.

Other and further important objects of this invention will become apparent from the disclosures in the following specification and accompanying drawings.

In the drawings:

Fig. 1 is a top plan view of a harvester platform incorporating the device of this invention;

Fig. 2 is a sectional view taken on the line 2—2 of Fig. 1; and

Fig. 3 is an enlarged detail view of a portion of the device as shown in Fig. 2.

As shown in the drawings, reference numeral 10 indicates generally a platform for an agricultural harvester. The platform 10 includes a reciprocating cutter bar 11 extending across the forward edge thereof, laterally spaced gathering points 12 and 13 disposed at the outer ends of the cutter bar, a relatively wide deck or floor 14, a back wall 15 and end walls 16 and 17. An auger conveyor 18 is journally mounted in the opposed end walls 16 and 17 and is adapted to be rotatably driven. The auger includes a relatively large diameter core 19 and screw flights 20 and 21 thereon. The screw flight 20 extends from the end wall 16 to a position adjacent a center portion 22 of the platform 10. Similarly, the screw flight 21 extends from the end wall 17 to the center portion 22 of the platform. The screw flights 20 and 21 are oppositely pitched so that rotation of the auger conveyor 18 in one direction will cause simultaneous lateral movement of grain and straw to the central portion 22 of the platform.

Harvesters such as the harvester of this invention are adapted to be propelled through a field of standing grain whereupon the cutter bar 11 severs the grain at the butt ends of the straw causing the grain and straw to fall rearwardly over the top of the auger conveyor 18. The screw flights 20 and 21 then feed the cut grain and straw toward the center portion 22 of the platform. Oftentimes grain will be preliminarily cut and redeposited in the field, either scattered or in windrows, and in such an event pick up means would be employed in lieu of the cutter bar for the purpose of delivering grain and straw to the auger conveyor.

The central portion of the platform 22 is further defined as that portion lying opposite a feeder housing 23. The feeder housing in a self-propelled combine is generally centrally located between the ends of the platform and is employed for the purpose of delivering the harvested grain and straw to a further treating means such as the separator and threshing mechanism. It should be understood that the feeder housing need not be positioned centrally of the harvester platform but may be more or less disposed at one side thereof, in which event the screw flights 20 or 21 would have to be increased or decreased in length to compensate for such offset positioning of the feeder housing, and that the portion 22 heretofore stated to be the center of the platform should be constructed to mean that portion of the platform adjacent or opposite the feeder housing to which the screw flight of the auger feeds grain and straw material.

As stated above it is the object of this invention to provide means on and around the auger 18 for delivering the grain and straw fed longitudinally of the auger rearwardly into the feeder housing 23. The transition from the movement of the grain transversely of the harvester platform to a longitudinal direction through the feeder housing 23 creates a difficult problem and one which is extremely important to the successful operation of a harvester and particularly a harvester thresher. The means for accomplishing the right angle turn of grain and straw includes a plurality of spring fingers extending outwardly from the core 19 of the auger conveyor. The spring fingers designated by the numeral 24 are arranged in circumferentially spaced rows. Grain fed along the auger conveyor 18 is urged rearwardly by downward and under turning of the auger conveyor as indicated by the arrow 25. The spring fingers 24 sweep the grain and straw over the deck 14 of the platform 10 and rearwardly toward the feeder housing 23. The fingers are positioned on the auger core substantially across the entire width of the feeder conveyor 23 and within the portion 22 of the platform. As best shown in Fig. 2, a chain type feeder conveyor 26 is maintained in inclined position within the feeder housing 23 and extends forwardly onto the platform 10 where it extends around the core 19 of the auger conveyor 18. Spaced apart sprockets 27 and 28 are formed on the auger core 19 and constitute the driving support for the lower forward end of the feeder conveyor. The upper end of the chain conveyor is carried on laterally spaced apart sprockets 29 and 30 which are respectively aligned with the lower sprockets 27 and 28. As shown in Figs. 1 and 3 the chain type conveyor includes laterally spaced apart endless chains 31 and 32 which adjoin the sprockets 27 and 29, and 28 and 30. Cross slats 33 and 34 are provided on each of the endless chains 31 and 32 of the chain conveyor 26 in aligned relationship so that the combined slats of both chains bridge across the feeder housing 23. It is thus apparent that the cross slats 33 and 34 are in effect only half slats and individually extend only halfway across the space 22 adjacent the feeder housing 23. It would, of course, be possible to make the slats full length without affecting the invention. The conveyor and thus also the slats have been shown divided to eliminate the necessary critical alignment of the spaced endless chains. The cross slats 33 and 34 are timed and positioned with respect to the auger core 19 and the spring fingers 24 so that a pair of slats is positioned between each of adjacent rows of spring fingers 24. It is the function of the slats 33 and 34 to provide means for stripping grain and straw in an endwise movement outward from the spring fingers on the under and far side of the auger conveyor 18. The particular endwise direction of stripping grain from the spring fingers is extremely important to the successful operation of the machine. A straight stripper would tend to compress and/or hairpin grain therein. Further, delivery of the grain from the auger conveyor to the feeder conveyor is relatively easily accomplished as the feeder conveyor is carried directly into the path of movement of material by the auger by reason of the employment of the auger core as the lower carrying means for the endless feeder conveyor. The feeder conveyor 26 is known as the undershot type wherein the material carried thereby is held against the upwardly and rearwardly inclined floor 35 of the feeder housing 23 by the cross slats 33 and 34. A chain guide 44 is carried on the spaced apart side walls of the feeder housing by the weld attachment of upwardly turned flanges 45 and 46 as shown at 47 and 48. The chain guide 44 as best shown in Fig. 2 holds the lower flight of the undershot conveyor chains down against the upwardly inclined floor of the feeder housing. As best shown in Fig. 3 the spring fingers 24 have inwardly projecting portions in the form of loops or coils 36 which constitute the hinge attaching means to fixed rods 37, 38, 39 and 40 which are equally spaced within, and extending longitudinally of, the auger core 19. Further, the fingers 24 project outwardly through substantially rectangular or slit like apertures 41 in the core 19. Thus as the core 19 is rotated it in turn drives the fingers 24.

In the operation of the device of this invention the harvester is propelled across a field of grain and the gathering means causes grain and straw to be deposited on the transversely positioned auger conveyor 18. The screw flights 20 and 21 of the auger 18 cause lateral movement of the grain in opposite directions so that all material is fed to the location 22 positioned between the screw flights 20 and 21. The screw flights cause the grain and straw to be pushed into that portion of the auger having the outwardly extending spring fingers 24 whereupon the rotation of the auger in the direction as indicated by the arrow 25 will cause a downward sweeping of the grain across the floor 14 of the platform toward the rear wall 15 and into the path of the undershot feeder conveyor 26. In order to insure that there shall be no climbing of the grain and straw upwardly and thence forwardly over the auger conveyor 18 by the spring fingers 24, the cross slats 33 and 34 of the conveyor 26 act to strip the grain and straw from the spring fingers 24 and feed all the material up the inclined floor 35 of the feeder housing 23. The spring fingers driven by the auger core 19 slide over or sweep the underside of the cross slats 33 and 34.

It should be obvious that the harvester platform construction as described herein is capable of use on any type of harvesting machine such as a windrow harvester or a harvester thresher.

Various details of construction may be varied throughout a wide range without departing from the principles disclosed herein and I, therefore, do not propose limiting the patent granted hereon otherwise than as necessitated by the appended claim.

What is claimed is:

A harvester platform including a relatively wide grain receiving deck, end walls for said deck, an auger conveyor journally mounted in said end walls, spaced apart oppositely pitched screw flights on said auger conveyor arranged and constructed to feed grain between inner spaced ends thereof, outwardly projecting fingers on said auger conveyor located intermediate the spaced apart inner ends of the screw flights, a chain type feeder conveyor on said platform having its forward end extending around and supported by the auger conveyor at the portion of the auger conveyor having the projecting fingers, cross slats on said feeder conveyor, and said cross slats arranged for interengagement with said outwardly projecting fingers whereby grain material swept under the auger conveyor means by said outwardly projecting fingers will be stripped longitudinally outwardly of said fingers and thence be carried rearwardly solely by said feeder conveyor, said feeder conveyor including laterally spaced apart endless chains, said cross slats being separate on each of said chains and of a length to extend substantially half way across said feeder conveyor whereby aligned cross slats on the spaced chains complement the first named cross slats to bridge the feeder conveyor.

References Cited in the file of this patent

UNITED STATES PATENTS

| | | |
|---|---|---|
| 1,919,897 | MacGregor | July 25, 1933 |
| 2,390,680 | Ausherman | Dec. 11, 1945 |
| 2,464,919 | Carroll | Mar. 22, 1949 |
| 2,548,329 | Van Sickle | Apr. 10, 1951 |